(12) United States Patent
Ke et al.

(10) Patent No.: US 8,452,106 B2
(45) Date of Patent: May 28, 2013

(54) PARTITION MIN-HASH FOR PARTIAL-DUPLICATE IMAGE DETERMINATION

(75) Inventors: Qifa Ke, Cupertino, CA (US); Michael A. Isard, San Francisco, CA (US); David Changsoo Lee, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 636 days.

(21) Appl. No.: 12/729,250

(22) Filed: Mar. 23, 2010

(65) Prior Publication Data

US 2011/0235908 A1    Sep. 29, 2011

(51) Int. Cl.
*G06K 9/66* (2006.01)

(52) U.S. Cl.
USPC .......................................................... 382/195

(58) Field of Classification Search
None
See application file for complete search history.

(56) References Cited

U.S. PATENT DOCUMENTS

| | | | |
|---|---|---|---|
| 6,781,711 B1 * | 8/2004 | Rijavec et al. | 358/1.2 |
| 7,366,718 B1 | 4/2008 | Pugh et al. | |
| 7,421,128 B2 * | 9/2008 | Venkatesan et al. | 382/232 |
| 7,519,200 B2 * | 4/2009 | Gokturk et al. | 382/118 |
| 7,549,052 B2 * | 6/2009 | Haitsma et al. | 713/180 |
| 7,551,780 B2 * | 6/2009 | Nudd et al. | 382/190 |
| 7,639,387 B2 * | 12/2009 | Hull et al. | 358/1.18 |
| 8,055,078 B2 * | 11/2011 | Choi et al. | 382/209 |
| 8,094,872 B1 * | 1/2012 | Yagnik et al. | 382/100 |
| 8,126,274 B2 * | 2/2012 | Li et al. | 382/224 |
| 8,184,953 B1 * | 5/2012 | Covell et al. | 386/248 |
| 8,229,219 B1 * | 7/2012 | Ioffe | 382/168 |
| 8,295,617 B2 * | 10/2012 | Collins | 382/232 |
| 2007/0041657 A1 * | 2/2007 | Rychagov et al. | 382/274 |
| 2007/0127813 A1 | 6/2007 | Shah | |
| 2009/0060351 A1 * | 3/2009 | Li et al. | 382/224 |
| 2009/0132571 A1 | 5/2009 | Manasse et al. | |
| 2009/0220166 A1 * | 9/2009 | Choi et al. | 382/260 |
| 2010/0266215 A1 * | 10/2010 | Hua et al. | 382/229 |
| 2012/0099796 A1 * | 4/2012 | Zitnick, III | 382/199 |

OTHER PUBLICATIONS

Tan, et al., "Scalable Detection of Partial Near-Duplicate Videos by Visual-Temporal Consistency", Retrieved at << http://vireo.cs.cityu.edu.hk/papers/acmmm09-hktan.pdf >>, Proceedings of the seventeen ACM international conference on Multimedia, Oct. 19-24, 2009, pp. 10.

(Continued)

*Primary Examiner* — David Zarka
*Assistant Examiner* — Sean Motsinger
(74) *Attorney, Agent, or Firm* — Microsoft Corporation

(57) ABSTRACT

Images in a database or collection of images are each divided into multiple partitions with each partition corresponding to an area of an image. The partitions in an image may overlap with each other. Min-hash sketches are generated for each of the partitions and stored with the images. A user may submit an image and request that an image that is a partial match for the submitted image be located in the image collection. The submitted image is similarly divided into partitions and min-hash sketches are generated from the partitions. The min-hash sketches are compared with the stored min-hash sketches for matches, and images having partitions whose sketches are matches are returned as partial matching images.

20 Claims, 7 Drawing Sheets

OTHER PUBLICATIONS

Foo, et al., "Clustering Near-Duplicate Images in Large Collections", Retrieved at << http://goanna.cs.rmit.edu.au/~jufoo/pdfs/MIR07_Foo.pdf >>, Proceedings of the international workshop on multimedia information retrieval, Sep. 28-29, 2007, pp. 10.

Yang, et al., "MyFinder: Near-duplicate Detection for Large Image Collections", Retrieved at << http://www.uweb.ucsb.edu/~xinyang/paper/mm2009.pdf >>, Proceedings of the 17th International Conference on Multimedia, Oct. 19-24, 2009, pp. 1013-1014.

Fisichella, et al., "Efficient Incremental Near Duplicate Detection based on Locality Sensitive Hashing", Retrieved at << http://www.l3s.de/web/upload/documents/1/SimSearchExt.pdf >>, Retrieved Date: Feb. 4, 2010, pp. 14.

Torralba, et al., "Small Codes and Large Databases for Recognition", Retrieved at << http://www.cs.jhu.edu/~misha/ReadingSeminar/Papers/Torralba08.pdf >>, In Computer Vision and Pattern Recognition, CVPR 2008, IEEE Conference, Aug. 5, 2008, pp. 8.

Broder, Andrei Z., "On the Resemblance and Containment of Documents", Retrieved at << http://74.125.153.132/search?q=cache:2jph8NHpDo8J:citeseerx.ist.psu.edu/viewdoc/download%3Fdoi%3D10.1.1.24.779%26rep%3Drep1%26type%3Dpdf+On+the+Resemblance+and+Containment+of+Documents&cd=1&hl=en&ct=clnk >>, Proceedings of the Compression and Complexity of Sequences, Jun. 11-13, 1997, pp. 12.

Chum, et al., "Geometric Minhashing: Finding a (Thick) Needle in a Haystack", Retrieved at << http://cmp.felk.cvut.cz/~chum/papers/chum09cvpr.pdf >>, Spring 2009 Pattern Recognition and Computer Vision Colloquium, Apr. 23, 2009, pp. 8.

Chum, et al., "Scalable Near Identical Image and Shot Detection", Retrieved at << http://cmp.felk.cvut.cz/~chum/papers/chum07civr.pdf >>, Proceedings of the 6th ACM international conference on Image and video retrieval, Jul. 9-11, 2007, pp. 8.

Chum, et al., "Near Duplicate Image Detection: Min-Hash and Tf-idf Weighting", Retrieved at << http://cmp.felk.cvut.cz/~chum/papers/chum_bmvc08.pdf >>, BMVC, Sep. 1-4, 2008, pp. 10.

Indyk, et al., "Approximate Nearest Neighbors: Towards Removing the Curse of Dimensionality", Retrieved at << http://www.corelab.ece.ntua.gr/courses/ds.grad/NNPLEB.pdf >>, Proceedings of the thirtieth annual ACM symposium on Theory of computing, May 24-26, 1998, pp. 1-28.

Jain, et al., "Fast Image Search for Learned Metrics", Retrieved at << http://www.cs.utexas.edu/~grauman/papers/jain_kulis_grauman_cvpr2008.pdf >>, In Proceedings of the IEEE Conference on Computer Vision and Pattern Recognition (CVPR), Jun. 2008, pp. 8.

Jegou, et al., "Hamming Embedding and Weak Geometric Consistency for Large Scale Image Search", Retrieved at https://lear.inrialpes.fr/pubs/2008/JDS08/jegou_hewgc08.pdf >>, Proceedings of the 10th European Conference on Computer Vision: Part I, Oct. 12-18, 2008, pp. 1-15.

Ke, et al., "Efficient Near-duplicate Detection and Sub-image Retrieval", Retrieved at << http://www.cs.cmu.edu/~yke/retrieval/mm2004-retrieval.pdf >>, Proceedings of the 12th annual ACM international conference on Multimedia, Oct. 10-16, 2004, pp. 8.

Lowe, David G., "Distinctive Image Features from Scale-invariant Keypoints", Retrieved at << http://people.cs.ubc.ca/~lowe/papers/ijcv04.pdf >>, International Journal of Computer Vision, vol. 60, No. 2, Nov. 2004, pp. 1-28.

Mikolajczyk, et al., "A Performance Evaluation of Local Descriptors", Retrieved at << http://www.robots.ox.ac.uk/~vgg/research/affine/det_eval_files/mikolajczyk_pami2004.pdf >>, IEEE Transactions on Pattern Analysis and Machine Intelligence, vol. 27, No. 10, Oct. 2005, pp. 1615-1630.

Philbin, et al., "Object Retrieval with Large Vocabularies and Fast Spatial Matching", Retrieved at << http://www.robots.ox.ac.uk/~vgg/publications/papers/philbin07.pdf >>, IEEE Computer Society Conference on Computer Vision and Pattern Recognition (CVPR 2007), Jun. 18-23, 2007, pp. 8.

Sivic, et al., "Video Google: A Text Retrieval Approach to Object Matching in Videos", Retrieved at << http://www.robots.ox.ac.uk/~vgg/publications/papers/sivic03.pdf >>, Proceedings of the Ninth IEEE International Conference on Computer Vision, vol. 2, Oct. 13-16, 2003, pp. 1-8.

\* cited by examiner

FIG. 8    800

PARTITION MIN-HASH FOR PARTIAL-DUPLICATE IMAGE DETERMINATION

BACKGROUND

As digital imaging has increased in popularity there has been an increased demand for software that can recognize similar or duplicate digital images based on the contents of the images. One such method for identifying duplicate images is known as the min-hash algorithm.

In the min-hash algorithm, one or more hashing functions are applied to each visual word associated with the image, and the visual word with the minimum hash value is selected as a global descriptor, i.e., the min-hash, of the given image. Multiple hash functions are usually applied to compute a sketch—a set of min-hashes that are used jointly to represent the image. Two images that have matching sketches are identified as matching images. The degree of sameness between matching images may be adjusted by changing the number of hashing functions for a sketch that are applied to the images, as well as the number of sketches generated for each image.

While the min-hash algorithm is useful for identifying matching images, it may have difficulty determining partial matches within images. For example, a user may be interested in all images in a collection that include a landmark such as the Eiffel tower. The min-hash algorithm described above would not be effective for identifying such partially matching images.

SUMMARY

A system for identifying partial image matches is provided. Images in a database or collection of images are each divided into multiple partitions with each partition corresponding to an area of an image. The partitions in an image may overlap with each other. Min-hash sketches are generated for each of the partitions and stored with the images. A user may submit an image and request that an image that is a partial match for the submitted image be located in the image collection. The submitted image is similarly divided into partitions and min-hash sketches are generated from the partitions. The min-hash sketches are compared with the stored min-hash sketches for matches, and images having partitions whose sketches are matches are returned to the user as partial matching images.

In an implementation, a first image is received at a computing device. The first image is divided into partitions by the computing device. For each partition of the first image, one or more min-hash sketches are generated by the computing device, and the generated one or more min-hash sketches are stored for each partition of the first image by the computing device.

Implementations may include some or all of the following features. A second image may be received. The second image may be divided into partitions. For each partition of the second image, one or more min-hash sketches may be generated. It may be determined if the first image matches the second image using the min-hash sketches of the first image and the min-hash sketches of the second image. Determining if the first image matches the second image may using the min-hash sketches of the first image and the min-hash sketches of the second image may include determining if any of the min-hash sketches of the first image matches any of the min-hash sketches of the second image, and if so, determining that the first image matches the second image. Determining if the first image matches the second image using the min-hash sketches of the first image and the min-hash sketches of the second image may include determining if all of the min-hash sketches of the first image match a min-hash sketch of the second image, and if so, determining that the first image matches the second image. The first image may be divided into a grid of elements. One or more min-hash sketches for each element may be determined. The computed one or more min-hash sketches of each element may be stored. Each partition may include a plurality of grid elements. Determining a min-hash sketch for a partition may include retrieving the stored one or more min-hash sketches for each element of the partition, and selecting the minimum retrieved min-hash sketch as the min-hash sketch for the partition. The partitions may be overlapping partitions. The partitions may be non-overlapping partitions. Determining a min-hash sketch for a partition may include, for each of a plurality of hash functions, determining a min-hash of a visual word from the partition using the hash function, and adding the determined min-hash to the sketch of the partition.

In an implementation, a first image is received at a computing device. A plurality of features of the first image is determined by the computing device. A min-hash sketch of the first image is generated by the computing device. A geometric relationship for a pair of features from the determined features of the first image is determined by the computing device. The geometric relationship is associated with the sketch by the computing device, and the sketch and the associated geometric relationship are stored for the first image by the computing device.

Implementations may include some or all of the following features. A second image may be received. A min-hash sketch of the second image may be generated. It may be determined if the sketch of the first image matches the min-hash sketch of the second image. If it is determined that sketch of the first image matches the sketch of the second image, features from the second image may be determined. A geometric relationship for a pair of features from the determined features of the second image may be determined. If the geometric relationship for the pair of features from the first image matches the geometric relationship for the pair of features from the second image, then the first image matches the second image. The features may comprise visual words.

This summary is provided to introduce a selection of concepts in a simplified form that is further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
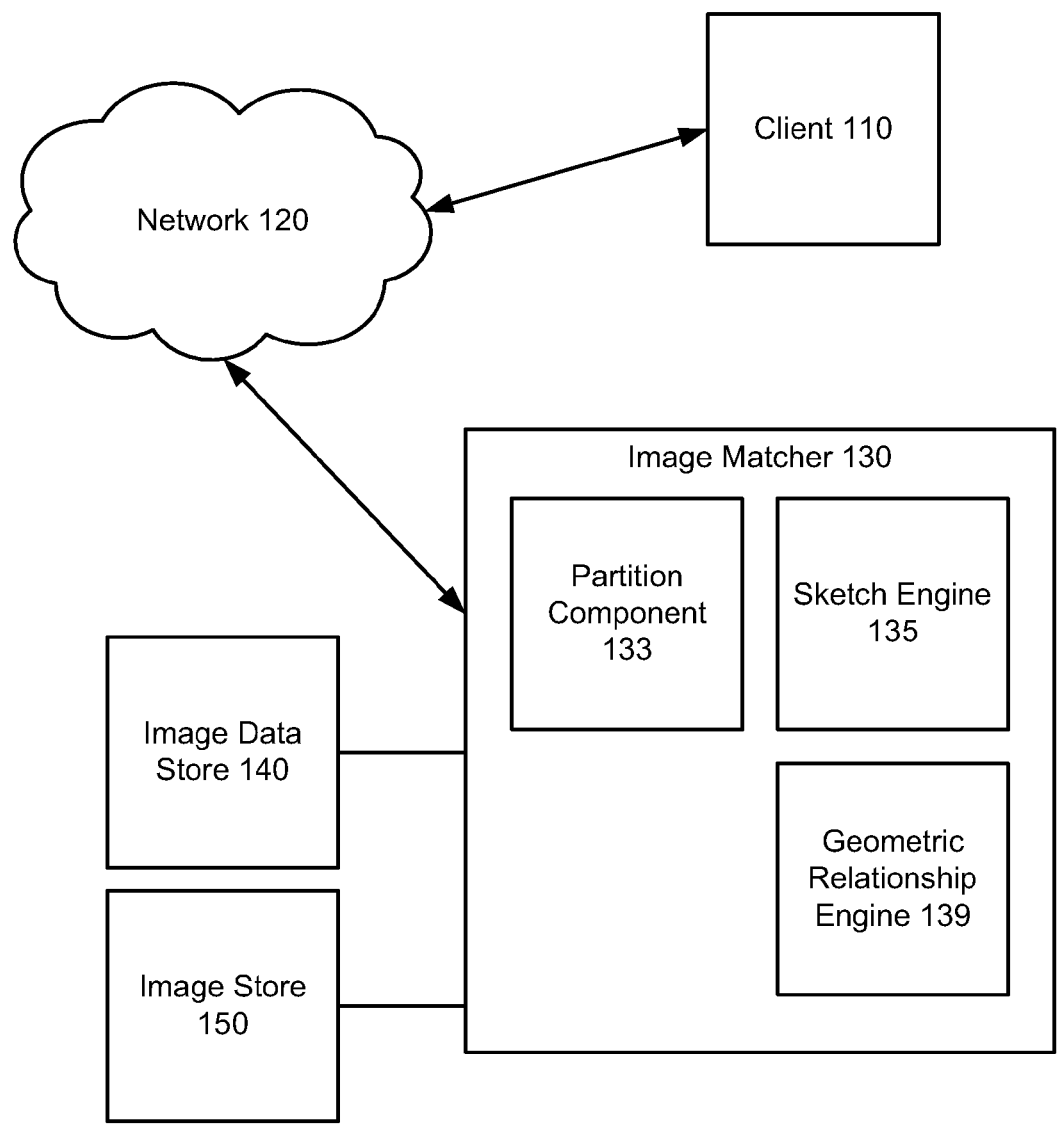
FIG. 1 is an illustration of an exemplary environment for identifying duplicate or partially duplicate images.

FIG. 1 is an illustration of an exemplary environment 100 for identifying duplicate or partially duplicate images. The environment may include a client 110. The client 110 may be configured to communicate with an image matcher 130 through a network 120. The network 120 may be a variety of network types including the public switched telephone network (PSTN), a cellular telephone network, and a packet switched network (e.g., the Internet). While the client 110 and the image matcher 130 are illustrated as being connected by the network 120, in some implementations it is contemplated that the client 110 and the image matcher 130 are directly connected to each other or even executed by the same computing system.

Figure 9:
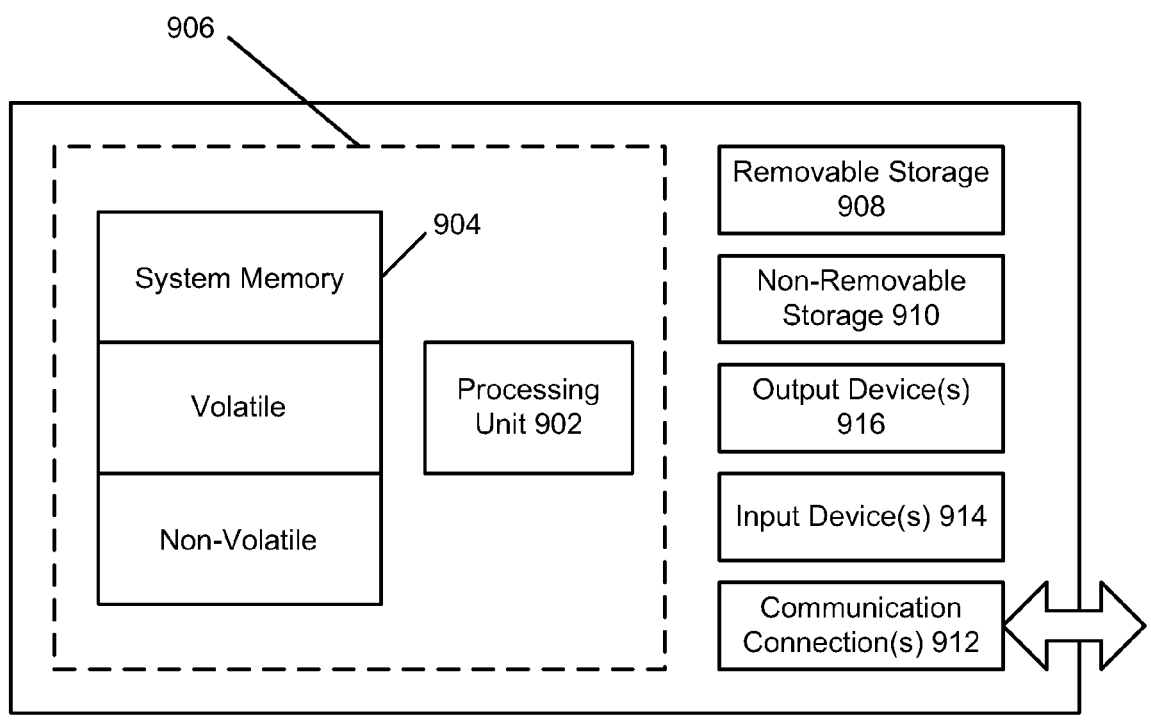
FIG. 9 is a block diagram of a computing system environment according to an implementation of the present system.

In some implementations, the client 110 may include a desktop personal computer, workstation, laptop, PDA, cell phone, or any WAP-enabled device or any other computing device capable of interfacing directly or indirectly with the network 120 such as a computing device 900 illustrated in FIG. 9. The client 110 may run an HTTP client, e.g., a browsing program, such as MICROSOFT INTERNET EXPLORER or other browser, or a WAP-enabled browser in the case of a cell phone, PDA or other wireless device, or the like, allowing a user of the client 110 to access information available to it at the image matcher 130 or to provide information to the image matcher 130. Other applications may also be used by the client 110 to access or provide information to the image matcher 130, for example. In some implementations, the image matcher 130 may be implemented using one or more general purpose computing systems such as the computing device 900.

In some implementations, the image matcher 130 may receive an image from a user of the client 110 and determine one or more images that is a partial match for the received image. The determined image(s) may then be presented or identified to the user who sent the original image. The determined image(s) may be an image from an image store 150. The image store 150 may store images received or collected from one or more users. For example, the image store 150 may store images collected from the Internet. While the image store 150 is illustrated as being directly connected to the image matcher 130, it is contemplated that the image store 150 may be connected to the image store 150 via the network 120 or integrated directly into the image matcher 130.

The image matcher 130 may process the images from the image store 150 to generate image data. In some implementations, the image data may be a hash table of min-hash sketches generated from partitions of the images. As described, a problem associated with conventional methods for determining image duplicates is that they fail to locate partial duplicates. A partial duplicate of an image is an image that includes a duplicate or similar partition or feature of the image. For example, an image of a BMW car that includes the BMW logo may be a partial duplicate of another image of a different BMW car that also includes the BMW logo because both images include the BMW logo.

In some implementations, images may include one or more features. A feature of an image may correspond to a region of interest in the image. The features of an image may be represented by what are known as visual words. A visual word is a numeric representation of a feature of an image. Methods for identifying and extracting features from images and generating corresponding visual words are well known and beyond the scope of this document. Any one or a variety of well known techniques and methods may be used. Moreover, in an implementation, each received or stored image in the image store 150 has an associated set of visual words.

In some implementations, the image matcher 130 may include a partition component 133. The partition component 133 may process the images by dividing the images into some number of partitions. Depending on the implementation, the partitions may be non-overlapping partitions or overlapping partitions. A non-overlapping partition has no regions of the image in common with another partition. Conversely, an overlapping partition has regions of the image in common with other partitions. By using overlapping partitions, the chances of a partition bifurcating a region of interest in an image are reduced thus leading to a greater probability of identifying a matching partition. In some implementations, the amount of overlap between partitions may be approximately 50%. However, other percentages may be used.

The number of partitions selected from an image by the partition component 133 may depend on the size of the image. For example, a larger image may warrant a greater number of partitions. In some implementations, the number of partitions selected may vary between approximately 50 and 150. More or fewer partitions may be selected. In some implementations, the size of each partition may be the same for each image. In other implementations, the size of the partitions may vary and may be multi-scale (i.e., the size can vary for each image).

Figure 2:
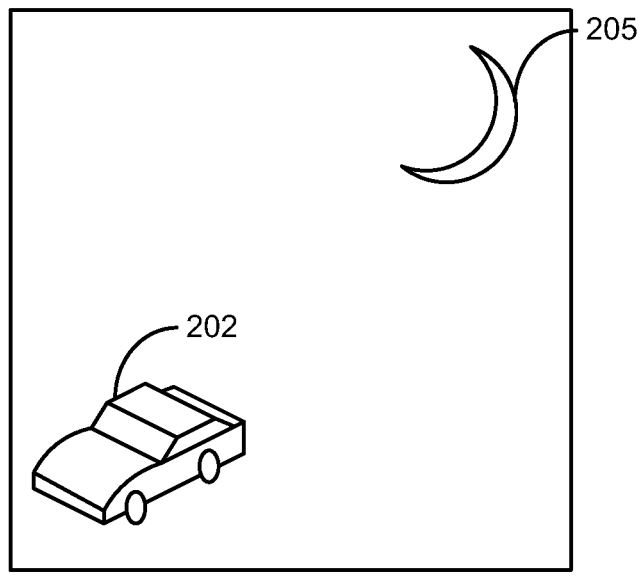
FIG. 2 is an illustration of an exemplary image.

For example, FIG. 2 illustrates an example image 200 that may be stored and retrieved from memory or storage such as the image store 150. The image includes two objects: a car 202 and a moon 205. For each object, multiple features and thus multiple visual words may be extracted. A user may wish to locate one or more partial duplicate images that contain an object that is similar to the car 202, for example.

Figure 3:
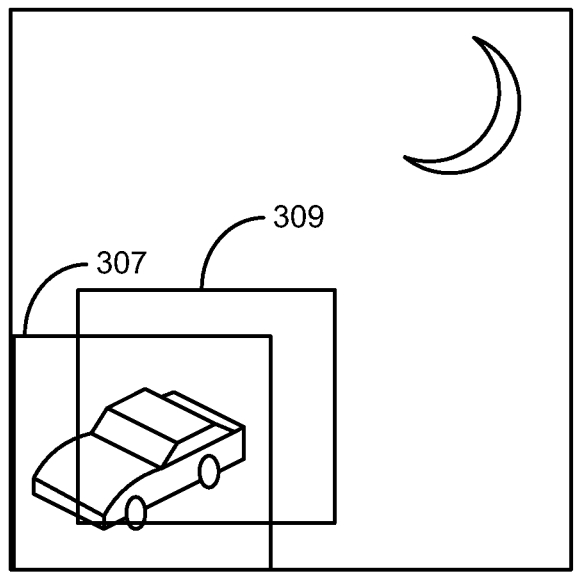
FIG. 3 illustrates an exemplary image including two generated partitions.

FIG. 3 illustrates the example image 200 including two generated partitions. As illustrated, a partition 307 and a partition 309 have been defined on the image 200. The partitions 307 and 309 are overlapping partitions because there are overlapping areas of the image 200 included in each partition. While only two partitions are shown, it is for illustrative purposes only; the entire image 200 may be divided into multiple partitions. As illustrated, the size of the partitions 307 and 309 has been selected such that an entire object (e.g., the car 202) is captured by at least one partition. Other size partitions may also be used. In some implementations, only a subset of the features belonging to the car 202 is in a single partition. Each partition may be uniform in size, and in other implementations the partitions may vary in size.

The image matcher 130 may further include a sketch engine 135. The sketch engine 135 may generate one or more sketches for each of the generated partitions. In some implementations, the sketch may be a min-hash sketch; however, other types of sketches may be used. In some implementations, a sketch may include one or more min-hashes. Each min-hash may be the visual word with the minimum hash value generated from the visual words associated with the partition for a particular hash function. Each hash function may be a different hash function, and the number of hash functions used may be dependent on the amount of similarity desired by partial duplicate matches.

For example, in order for a partition to match another partition, the min-hashes associated with its sketch may match each min-hash associated with another partition's sketch. Therefore, as the number of min-hashes used for each sketch increases, the lower the likelihood that a sketch will match another sketch. In implementations where close matches are desired, a low number of min-hashes may be used. In implementations where strict duplicate matches are desired, a high number of min-hashes may be used. In some implementations, each sketch may include two min-hashes; however, more or fewer min-hashes may be used.

In some implementations, the sketch engine 135 may store generated sketches for each partition in an image data store 140. The image data store 140 may comprise a hash table, for example. Thus, in some implementations, the image matcher 130 may identify matching partitions (i.e., a partial match) by identifying a hash collision between sketches stored in the image data store 140.

As described above, the partitions may be overlapping partitions which may lead to redundant computations between sketches for overlapping partitions. Thus, in some implementations, the sketch engine 135 may further divide images into a grid of elements. The elements may be uniform in size and smaller than the partitions. Each partition may therefore include multiple elements, and overlapping partitions may include multiple elements in common.

In implementations using elements, the sketch engine 135 may determine and store a min-hash for each hash function for each element. When the sketch engine 135 generates a sketch for a partition, the sketch engine may retrieve the stored min-hashes for each element in the partition. The sketch engine 135 may then, for each hash function, select the minimum min-hash generated for the elements. The minimum min-hash for each hash function may be added to the sketch for the partition. As may be appreciated, because the min-hashes are computed once for each element, redundant computation of min-hashes between partitions is greatly reduced.

Figure 4:
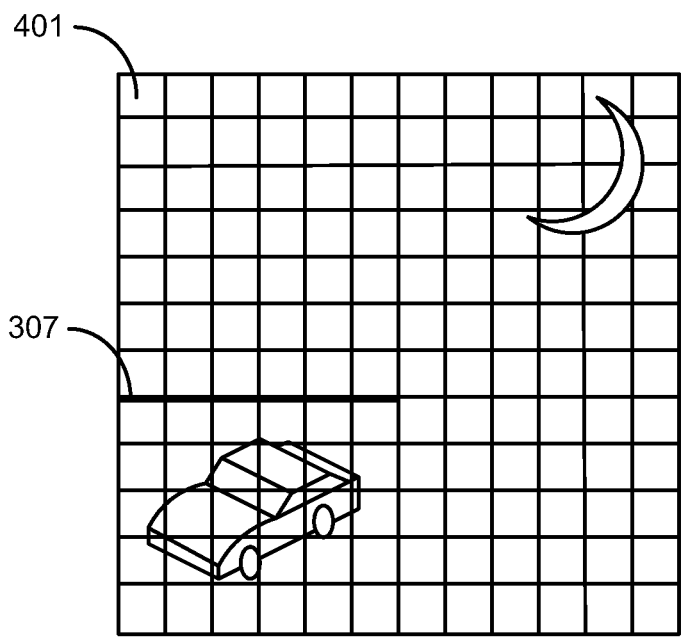
FIG. 4 is an illustration of an exemplary image divided into a grid of elements.

FIG. 4 is an illustration of the image 200 divided into a grid of elements. The grid of elements includes multiple elements 401. While 144 elements 401 are shown, it is for illustrative purposes only; more or fewer elements 401 may be used in the grid. The number of elements used may depend on the size of the image 200, for example.

In some implementations, the image matcher 130 may generate min-hash sketches for the partition of one or more of the images stored in the image store 150 and store the generated min-hash sketches in the image data store 140. The image matcher 130 may receive an image from a user of the client 110. The image matcher 130 may then generate min-hash sketches for the partitions of the received image. The generated min-hash sketches for the received image may be matched against the stored min-hash sketches in the image data store 140. In some implementations, a match may be indicated by a hash collision. Stored images with partitions having min-hash sketches that match may be returned to the user as partial matches of the received image. In implementations where a full match is requested by the user, images with partitions having min-hash sketches that match each (or a majority, or above a predetermined number, threshold, or percentage) of the generated min-hash sketches may be returned (e.g., to the user) as a full match.

In some implementations, the image matcher 130 may include a geometric relationship engine 139. The geometric relationship engine 139 may determine a geometric relationship between the features of an image partition or the entire image. The geometric relationship may be stored with a generated sketch, and may be used as an additional check against a proposed complete or partial image match. In some implementations, a geometric relationship may be determined for each feature pair in an image partition. In implementations where partitions are not used, a geometric relationship may be determined for each feature pair in an image. A feature may correspond to each visual word associated with the image or with a partition of the image.

Figure 5:
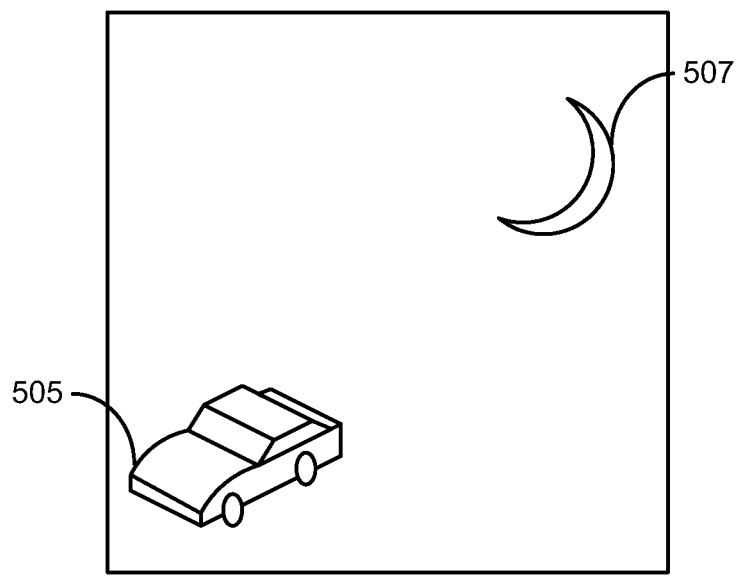
FIG. 5 is an illustration of an exemplary image including features.

For example, FIG. 5 illustrates features of an image 500. As shown, the image 500 includes two features: a feature 505 and a feature 507. Moreover, the features 505 and 507 have a geometric relationship between them. For example, the feature 507 is oriented upward and to the right of the feature 505 in the image 500. While only two features 505 and 507 are shown, it is for illustrative purposes only; there is no limit to the number of features that may be included in an image. Moreover, each of the features 505 and 507 may be made up of one or more features.

The geometric relationships between the features of an image or partition can be used as a check against a potential matching sketch for a received image. For example, after a matching sketch for a partition or image is found, the geometric relationships between the features of the images or image partitions can be compared to determine if the images or image partitions do indeed match.

In some implementations, the geometric relationships may be determined for each feature pair. The geometric relationships may be associated with a sketch and stored in the image data store 140. For example, the geometric relationships may be appended to a generated sketch for an image or a partition.

Figure 6:
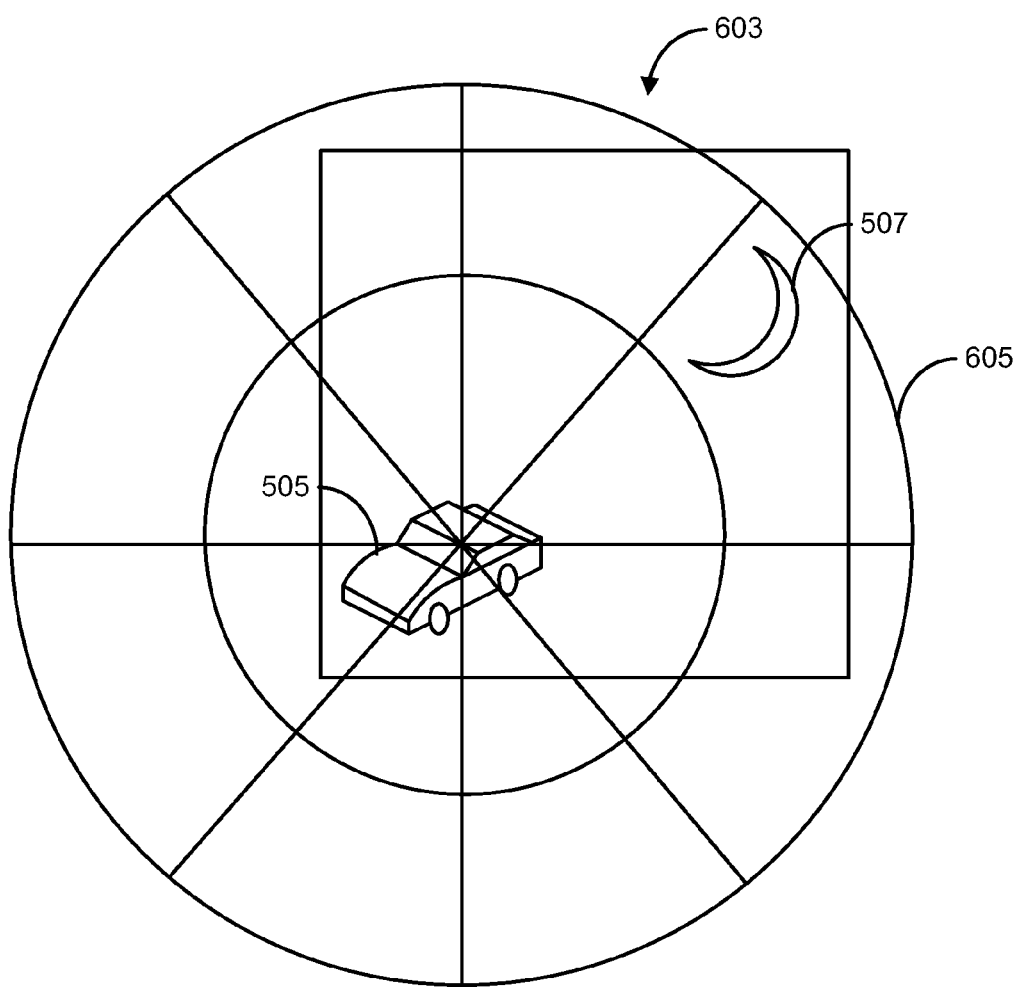
FIG. 6 is an illustration of an exemplary grid for determining geometric relationships in an image.

In some implementations, the geometric relationship between a feature pair may be encoded using a circular encoding method. Such a method is described with respect to FIG. 6. As illustrated, a circular grid 603 has been superimposed on the image 500 centered at the feature 505. The geometric relationship between the feature 505 and the feature 507 may be encoded into a sketch by encoding a reference to the area of the circular grid 603 that the feature 507 lays in with respect to the feature 505. As illustrated, the feature 507 lays in the area 605. Thus, an indicator of the area 605 may be associated with the sketch generated for the image 500. The indicator may be encoded by assigning a number to each of the areas of the grid 603, and encoding the corresponding number for a feature pair into a generated sketch. In some implementations, one or more indicators of the relative scale of the features of the feature pair may also be generated and associated with the sketch.

In some implementations, a geometric configuration may be pre-computed for each sketch, by centering the circular grid 603 at the first feature of the sketch, and assigning an identifier to every other feature in the sketch based on the location of the feature in the circular grid. Other shaped grids may also be used.

In some implementations, the image matcher 130 may further identify partial duplicate images in a set of collection of images (e.g., in the image store 150). Min-hash sketches may be generated for each image and inserted into one or more hash tables. Images with min-hash sketches that collide with other min-hash sketches in a hash table may then be considered matching or partial matching images. The matching images may be identified to a user or administration, for example.

Figure 7:
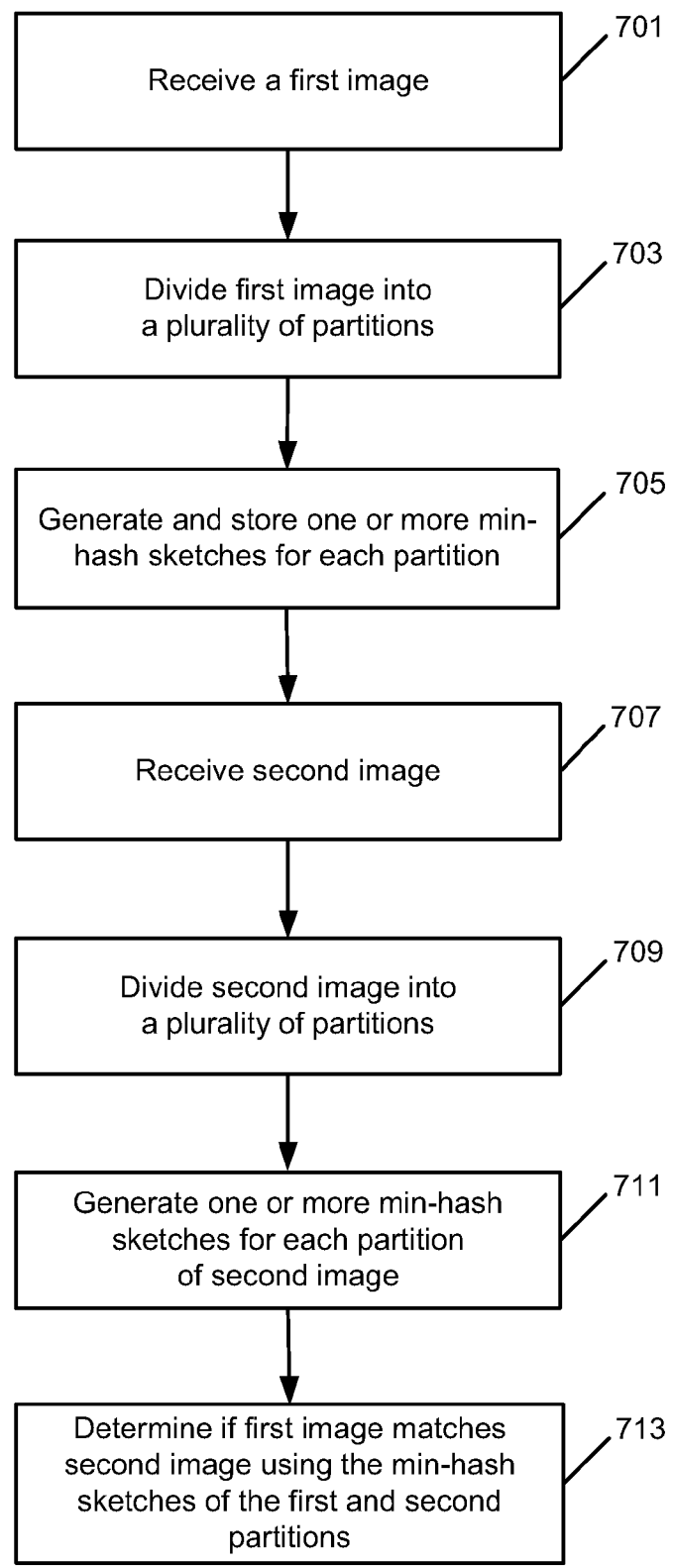
FIG. 7 is an operational flow of an implementation of a method for determining if an image is a partial match of another image.

FIG. 7 is an operational flow of an implementation of a method 700 for determining if an image is a partial match of another image. The method 700 may be implemented by the image matcher 130 in an implementation.

A first image is received at 701. The first image may be received at the image matcher 130 from an image store 150 through a network. In some implementations, the first image may be part of an image collection stored at the image store 150. So that the image in the image store 150 may be used by the image matcher 130 to identify partial matches, some or all of the images in the image store 150 may be processed by the image matcher 130.

The first image is divided into a plurality of partitions at 703. The first image may be divided into partitions by the partition component 133 of the image matcher 130. The partitions may be overlapping partitions or non-overlapping partitions. In some implementations, the first image may be further divided into a grid of elements. Each partition may include a plurality of elements.

One or more min-hash sketches are generated and stored for each partition at 705. The sketches may be generated and stored by the sketch engine 135 of the image matcher 130. In some implementations, a sketch may be generated for a partition by computing a min-hash of the visual words from each partition using one or more hash functions.

In implementations using elements, a min-hash may be computed by the sketch engine 135 using visual words from each element for the one or more hash functions. A sketch for a partition may be computed by retrieving the computed min-hashes for each hash function for the elements that comprise the partition, and the minimum min-hash for each hash function may be added to the sketch.

A second image is received at 707. The second image may be received from the client 110 by the image matcher 130 through the network 120. The second image may be submitted by a user who desires to receive one or more images that are partial or full matches for the second image.

The second image is divided into a plurality of partitions at 709. The second image may be divided into partitions by the partition component 133 of the image matcher 130. The partitions may be the same size as the partitions generated for the first image at 703.

One or more min-hash sketches are generated for each of the partitions at 711. The min-hash sketches may be generated for each partition of the second image by the sketch engine 135 of the image matcher 130.

A determination is made whether the second image matches the first image using the generated min-hash sketches at 713. The determination may be made by the image matcher 130. In some implementations, where a partial match is desired or selected by the user, the second image is determined to match the first image if a generated min-hash sketch for a partition of the first image matches a generated min-hash sketch for a partition of the second image. In some implementations, where a full match is desired or selected by the user, the second image is determined to match the first image if each generated min-hash sketch for the partitions of the second image matches a generated min-hash sketch for a partition of the first image. Depending on the implementation, a match may be determined if a majority of the generated min-hash sketches for the partitions of the second image matches generated min-hash sketches for the partitions of the first image, or if the number of the generated min-hash sketches for the partitions of the second image that match generated min-hash sketches for the partitions of the first image is above a predetermined number, threshold, or percentage.

Figure 8:
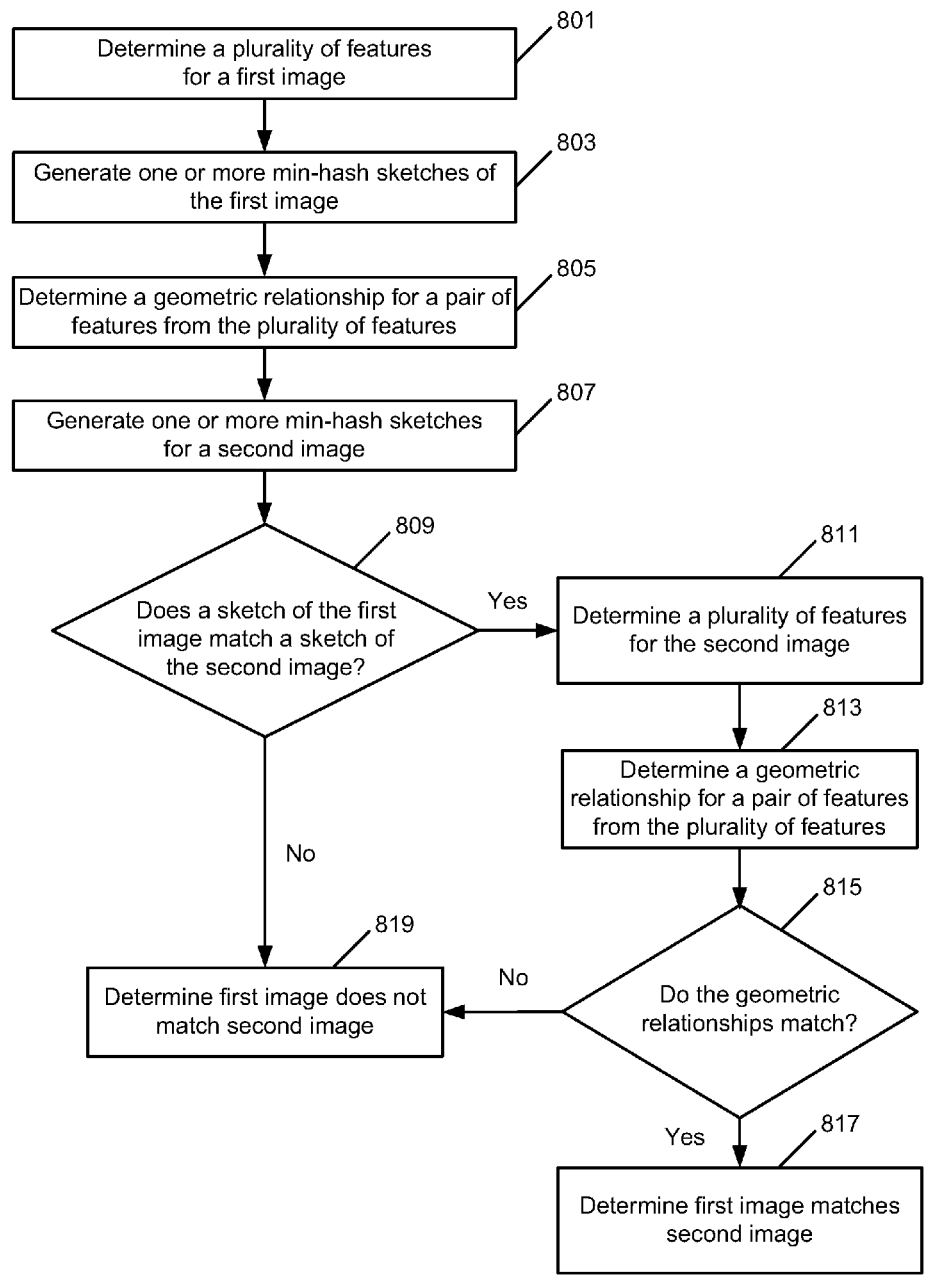
FIG. 8 is an operational flow of an implementation of a method for determining if an image is a match of another image using geometric relationships.

FIG. 8 is an operational flow of an implementation of a method 800 for determining if an image is a match of another image using geometric relationships. The method 800 may be implemented by the image matcher 130 in an implementation.

A plurality of features is determined for a first image at 801. The plurality of features may be determined by the image matcher 130. The plurality of features may correspond to one or more visual words from the first image. The first image may have been received at the image matcher 130 from an image store 150 through a network. In some implementations, the first image may be part of an image collection stored at the image store 150.

One or more min-hash sketches are generated for the first image at 803. The min-hash sketches may be generated by the sketch engine 135 of the image matcher 130. In some implementations, the sketches may be generated for the entire first image. In other implementations, the first image may be further divided into partitions and one or more min-hash sketches may be generated for each partition (or only some of the partitions in an implementation).

A geometric relationship for a pair of features from the plurality of features is generated for the first image at 805. The geometric relationship may be determined by the geometric relationship engine 139 of the image matcher 130. In some implementations, a geometric relationship may be determined for each feature pair from the plurality of features, and may be associated with the generated one or more sketches of the first image. In implementations where partitions are used, a geometric relationship may be generated for each pair of features in a particular partition and associated with the one or more min-hashes sketch for that partition.

One or more min-hash sketches are generated for a second image at 807. The min-hash sketches may be generated by the sketch engine 135 of the image matcher 130. The second image may have been submitted by a user who desires to receive one or more images that are matches for the second image. In implementations using partitions, one or more min-hash sketches may be generated for each of the partitions of the second image.

A determination is made as to whether a sketch of the first image matches a sketch of the second image at 809. The determination may be made by the sketch engine 135 of the image matcher 130. In implementations using partitions, the sketch engine 135 may determine if a min-hash of a partition of the first image matches a min-hash of a partition of the second image. If a sketch of the first image does not match a sketch of the second image, then the method 800 may continue to 819 where it is determined that the first image does not match the second image. Otherwise, the method 800 may continue at 811.

A plurality of features is determined for the second image at 811. The plurality of features may be determined by the image matcher 130.

A geometric relationship is determined for a pair of features of the plurality of features of the second image at 813. The geometric relationship may be determined by the geometric relationship engine 139 of the image matcher 130.

A determination is made as to whether the geometric relationship of the first image matches the geometric relationship of the second image at 815. The determination may be made by the geometric relationship engine 139 of the image matcher 130. By determining if the geometric relationships match for images having matching sketches, the geometric relations systems can further verify that the images are matching images, or that the partitions are matching partitions. If the geometric relationships match, the method 800 may continue to 817 where the image matcher 130 determines that the first image matches the second image. If the geometric relationships do not match, then the method 800 may continue at 819 where the image matcher determines that the first image does not match the second image.

FIG. 9 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by device 1000 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 1000.

Computing device 900 may contain communications connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
receiving a first image at a computing device through a network;
dividing the first image into a plurality of partitions by the computing device;
for each partition of the first image, generating one or more min-hash sketches for the partition by the computing device;
storing the generated one or more min-hash sketches for each partition of the first image by the computing device;
dividing the first image into a grid of elements;
determining one or more min-hashes of each element; and
storing the computed one or more min-hashes of each element.

2. The method of claim 1, further comprising:
receiving a second image;
dividing the second image into a plurality of partitions;
for each partition of the second image, generating one or more min-hash sketches for the partition; and
determining if the first image matches the second image using the min-hash sketches of the first image and the min-hash sketches of the second image.

3. The method of claim 2, wherein determining if the first image matches the second image using the min-hash sketches of the first image and the min-hash sketches of the second image comprises determining if any of the min-hash sketches of the first image matches any of the min-hash sketches of the second image, and if so, determining that the first image matches the second image.

4. The method of claim 2, wherein determining if the first image matches the second image using the min-hash sketches of the first image and the min-hash sketches of the second image comprises determining if all of the min-hash sketches of the first image match a min-hash sketch of the second image, and if so, determining that the first image matches the second image.

5. The method of claim 1, wherein each partition comprises a plurality of elements and determining a min-hash sketch for a partition comprises:
retrieving the stored one or more min-hashes for each element of the partition; and
selecting a minimum retrieved min-hash as the min-hash sketch for the partition.

6. The method of claim 1, wherein the partitions are overlapping partitions.

7. The method of claim 1, wherein the partitions are multi-scale.

8. The method of claim 1, wherein determining one or more min-hash sketches for a partition comprises, for each of a plurality of hash functions:
determining a min-hash of a visual word from the partition using the hash function; and
adding the determined min-hash to a sketch of the partition.

9. A method comprising:
receiving a first image at a computing device;
determining a plurality of features of the first image by the computing device;
generating a min-hash sketch of the first image by the computing device;
determining a geometric relationship for a pair of features from the plurality of determined features of the first image by the computing device;
associating the geometric relationship with the sketch by the computing device;
storing the min-hash sketch and the associated geometric relationship for the first image by the computing device;
receiving a second image;
generating a min-hash sketch of the second image;
determining if the min-hash sketch of the first image matches the min-hash sketch of the second image; and
if it is determined that the min-hash sketch of the first image matches the min-hash sketch of the second image:
determining a plurality of features from the of the second image;
determining a geometric relationship for a pair of features from the plurality of determined features of the second image; and
determining if the geometric relationship for the pair of features from the first image matches the geometric relationship for the pair of features from the second image, and if so, determining that the first image matches the second image.

10. The method of claim 9, wherein the features comprise visual words.

11. A system comprising:
at least one computing device; and
an image matcher adapted to:
receive a first image;
divide the first image into a plurality of partitions, wherein the partitions are overlapping partitions;
for each partition of the first image, generate one or more min-hash sketches for the partition; and
store the generated min-hash sketches for each partition of the first image.

12. The system of claim 11, wherein the image matcher is further adapted to:
receive a second image;
divide the second image into a plurality of partitions;
for each partition of the second image, generate one or more min-hash sketches for the partition; and
determine if the first image matches the second image using the min-hash sketches of the first image and the min-hash sketches of the second image.

13. The system of claim 12, wherein the first and second images are received from the same image collection.

14. The system of claim 12, wherein the image matcher determines if the first image matches the second image using the min-hash sketches of the first image and the min-hash sketches of the second image by determining if any of the min-hash sketches of the first image matches any of the min-hash sketches of the second image, and if so, determining that the first image matches the second image.

15. The system of claim 12, wherein the image matcher determines if the first image matches the second image using the min-hash sketches of the first image and the min-hash sketches of the second image by determining if all of the min-hash sketches of the first image match a min-hash sketch of the second image, and if so, determining that the first image matches the second image.

16. The system of claim 12, wherein the image matcher is further adapted to:
determine a pair of features of a partition of the first image;
determine a first geometric relationship for the pair of features of the partition of the first image; and
store the geometric relationship for the pair of features with the min-hash sketch of the partition.

17. The system of claim 16, wherein the image matcher is further adapted to:
determine a pair of features of a partition of the second image;
determine a second geometric relationship for the pair of features of the partition of the second image; and
determine if the first image matches the second image using the min-hash sketches of the first image, the min-hash sketches of the second image, and the first and second geometric relationship.

18. The method of claim 9, further comprising:
dividing the first image into a grid of elements;
determining one or more min-hashes of each element; and
storing the computed one or more min-hashes of each element.

19. The system of claim 11, wherein the image matcher divides the first image into a grid of elements, determines one or more min-hashes of each element, and stores the computed one or more min-hashes of each element.

20. The system of claim 11, wherein the partitions are multi-scale.

* * * * *